US010743286B2

(12) United States Patent
Li et al.

(10) Patent No.: US 10,743,286 B2
(45) Date of Patent: Aug. 11, 2020

(54) PAGING PROCESSING METHOD AND DEVICE

(71) Applicant: CHINA ACADEMY OF TELECOMMUNICATIONS TECHNOLOGY, Beijing (CN)

(72) Inventors: Xinyu Li, Beijing (CN); Huiying Zhang, Beijing (CN); Jing Liang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/470,814

(22) PCT Filed: Sep. 21, 2017

(86) PCT No.: PCT/CN2017/102580
§ 371 (c)(1),
(2) Date: Jun. 18, 2019

(87) PCT Pub. No.: WO2018/113357
PCT Pub. Date: Jun. 28, 2018

(65) Prior Publication Data
US 2019/0387498 A1 Dec. 19, 2019

(30) Foreign Application Priority Data
Dec. 20, 2016 (CN) .......................... 2016 1 1185706

(51) Int. Cl.
*H04W 68/00* (2009.01)
*H04W 68/08* (2009.01)
(Continued)

(52) U.S. Cl.
CPC .......... *H04W 68/08* (2013.01); *H04W 40/22* (2013.01); *H04W 68/005* (2013.01); *H04W 76/28* (2018.02); *H04W 88/04* (2013.01)

(58) Field of Classification Search
CPC ..... H04W 68/08; H04W 76/28; H04W 40/22; H04W 88/04; H04W 68/005
(Continued)

(56) References Cited

U.S. PATENT DOCUMENTS 9,369,946 B2 * 6/2016 Plicanic Samuelsson ..................
H04W 48/14
2012/0178485 A1 7/2012 Zeira et al.
(Continued)

FOREIGN PATENT DOCUMENTS

CN 103380632 A 10/2013
CN 104812069 A 7/2015
(Continued)

OTHER PUBLICATIONS

Written Opinion of the International Searching Authority and International Search Report from PCT/CN2017/102580, dated Nov. 30, 2017, with English translation from WIPO.
(Continued)

*Primary Examiner* — Amancio Gonzalez
(74) *Attorney, Agent, or Firm* — Ladas & Parry, LLP

(57) ABSTRACT

A paging processing method and a paging processing device are provided. The paging processing method includes: when a remote UE needs to monitor and/or receive a paging message through a paging relay, determining, by the remote UE, a relay UE corresponding to the remote UE, the relay UE being configured to monitor and/or receive the paging message transmitted by a network to the remote UE; establishing, by the remote UE, a paging relay connection with the relay UE; and after the establishment of the paging relay
(Continued)

connection, monitoring and/or receiving, by the remote UE, the paging message forwarded by the relay UE.

16 Claims, 7 Drawing Sheets

(51) Int. Cl.
    *H04W 76/28*     (2018.01)
    *H04W 40/22*     (2009.01)
    *H04W 88/04*     (2009.01)

(58) Field of Classification Search
    USPC ........................................................ 455/458
    See application file for complete search history.

(56) References Cited

U.S. PATENT DOCUMENTS

| | | |
|---|---|---|
| 2016/0088668 A1 | 3/2016 | Kim et al. |
| 2016/0302247 A1 | 10/2016 | Lu et al. |
| 2019/0239170 A1* | 8/2019 | Thangarasa ........... H04W 16/18 |

FOREIGN PATENT DOCUMENTS

| | | | |
|---|---|---|---|
| CN | 105850221 A | 8/2016 | |
| CN | 106162676 A | 11/2016 | |
| WO | 2011047503 A1 | 4/2011 | |
| WO | 2016123945 A1 | 8/2016 | |
| WO | 2016182653 A1 | 11/2016 | |
| WO | 2016186995 A1 | 11/2016 | |
| WO | 2016188680 A1 | 12/2016 | |
| WO | 2016197365 A1 | 12/2016 | |
| WO | WO-2016197365 A1 * | 12/2016 | ............ H04W 88/04 |
| WO | WO-2017099837 A1 * | 6/2017 | ............ H04W 76/14 |

OTHER PUBLICATIONS

First Office Action from CN app. No. 201611185706.5, dated Dec. 28, 2018, with English translation from Global Dossier.
Extended European Search Report from EP app. No. 17884766.1, dated Aug. 7, 2019.
First Office Action from TW app. No. 106133082, dated Sep. 19, 2019, with English translation.
"Solution for optimized UE management via Relay", S2-161567, SA WG2 Meeting #114, Sophia Antipolis, France, Apr. 11-15, 2016.

* cited by examiner

US 10,743,286 B2

PAGING PROCESSING METHOD AND DEVICE

CROSS-REFERENCE TO RELATED APPLICATIONS

The present application is the U.S. national phase of PCT Application No. PCT/CN2017/102580 filed on Sep. 21, 2017, which claims a priority to the Chinese patent application No. 201611185706.5 filed on Dec. 20, 2016, the disclosures of which are incorporated herein by reference in their entireties.

TECHNICAL FIELD

The present disclosure relates to the field of communication technology, in particular to a paging processing method and a paging processing device.

BACKGROUND

Along with the development of the mobile communication system, in order to facilitate an Internet of Things (IoT) device and a wearable device to access to a cellular network, a relay mechanism has been introduced into a Device to Device (D2D) communication technology. When an off-line remote User Equipment (UE) or a remote UE having relatively poor signal quality with a network needs to communicate with network, an on-line third-party UE in proximity to the remote UE may be selected for transferring data (i.e., a relay technology), and this third-party UE is called as a relay UE. An L2 relay technology (i.e., a relay technology based on a Long Term Evolution (LTE) layer 2 protocol) has been further introduced into a further enhanced D2D (feD2D) technology, so as to enable the remote UE, which is connected to an L2 relay UE, to be registered in an LTE core network, establish a Radio Resource Control (RRC) connection and communicate with the core network. In addition, in some cases, when the remote UE communicates with the network through the relay UE, it is able to improve a transmission success rate, and reduce the power consumption. Based on the above, there is an urgent need to provide a method for enabling the remote UE to monitor and/or receive a paging message.

SUMMARY

An object of the present disclosure is to provide a paging processing method and a paging processing device, so as to enable a UE to receive a paging message through a relay technology.

In one aspect, the present disclosure provides in some embodiments a paging processing method, including: when a remote UE needs to monitor and/or receive a paging message through a paging relay, determining, by the remote UE, a relay UE corresponding to the remote UE, the relay UE being configured to monitor and/or receive the paging message transmitted by a network to the remote UE; establishing, by the remote UE, a paging relay connection with the relay UE; and after the establishment of the paging relay connection, monitoring and/or receiving, by the remote UE, the paging message forwarded by the relay UE.

In a possible embodiment of the present disclosure, the establishing, by the remote UE, the paging relay connection with the relay UE includes: establishing, by the remote UE, a communication connection with the relay UE; after the establishment of the communication connection, transmitting, by the remote UE, a paging relay connection establishment request message to the relay UE; receiving, by the remote UE, a response message for a paging relay connection establishment request from the relay UE, the response message carrying a configuration parameter of a paging relay resource pool for forwarding the paging message allocated by a network device for the relay UE; configuring, by the remote UE, the paging relay resource pool in accordance with the configuration parameter, the paging relay resource pool being a reception resource pool through which the paging message is received by the remote UE from the relay UE; and transmitting, by the remote UE, a paging relay configuration completion message to the relay UE.

In a possible embodiment of the present disclosure, an identity of the remote UE is carried in the paging relay connection establishment request message.

In a possible embodiment of the present disclosure, the identity of the remote UE is a System Architecture Evolution-Temporary Mobile Subscriber Identity (S-TMSI) of the remote UE.

In a possible embodiment of the present disclosure, a Discontinuous Reception (DRX) configuration parameter of the remote UE is carried in the paging relay connection establishment request message. The relay UE is configured to calculate paging occasions for monitoring the paging message for the remote UE in accordance with the DRX configuration parameter of the remote UE, and monitor the paging message for the remote UE at a corresponding paging occasion.

In a possible embodiment of the present disclosure, the paging processing method further includes determining, by the remote UE, the paging occasion in accordance with the DRX configuration parameter, and monitoring, at the paging occasion, the paging message in the paging relay resource pool configured in accordance with a paging relay configuration message.

In a possible embodiment of the present disclosure, the paging processing method further includes, when channel quality between the remote UE and a base station is smaller than a first threshold and channel quality between the remote UE and the relay UE is greater than a second threshold, monitoring and/or receiving, by the remote UE, the paging message through the paging relay.

In a possible embodiment of the present disclosure, the first threshold and the second threshold are configured by the network.

In a possible embodiment of the present disclosure, the paging processing method further includes, when a current coverage enhancement level of the remote UE is a predetermined coverage enhancement level, monitoring and/or receiving, by the remote UE, the paging message through the paging relay.

In a possible embodiment of the present disclosure, the predetermined coverage enhancement level is configured by the network.

In another aspect, the present disclosure provides in some embodiments a paging processing method, including: establishing, by a relay UE, a paging relay connection with a remote UE which needs to monitor and/or receive a paging message through a paging relay; and monitoring and/or receiving, by the relay UE, the paging message transmitted by a network to the remote UE, and forwarding the paging message to the remote UE.

In a possible embodiment of the present disclosure, the establishing, by the relay UE, the paging relay connection with the remote UE includes: establishing, by the relay UE, a communication connection with the remote UE; after the establishment of the communication connection, receiving, by the relay UE, a paging relay connection establishment request message from the remote UE; requesting, by the relay UE, a network device for a paging relay resource pool; transmitting, by the relay UE, a response message for a paging relay connection establishment request to the remote UE, the response message carrying a configuration parameter of the paging relay resource pool for forwarding the paging message allocated by the network device for the relay UE, the remote UE being configured to configure the paging relay resource pool in accordance with the configuration parameter of the paging relay resource pool, the paging relay resource pool being a reception resource pool through which the paging message is received by the remote UE from the relay UE; and receiving, by the relay UE, a paging relay configuration completion message from the remote UE.

In a possible embodiment of the present disclosure, an identity of the remote UE is carried in the paging relay connection establishment request message.

In a possible embodiment of the present disclosure, the identity of the remote UE is an S-TMSI of the remote UE.

In a possible embodiment of the present disclosure, a DRX configuration parameter of the remote UE is carried in the paging relay connection establishment request message.

In a possible embodiment of the present disclosure, the monitoring and/or receiving, by the relay UE, the paging message for the remote UE from the network and forwarding the paging message to the remote UE includes: calculating, by the relay UE, paging occasions for monitoring the paging message for the remote UE in accordance with the DRX configuration parameter of the remote UE, and monitoring the paging message for the remote UE at a corresponding paging occasion; and upon the receipt of the paging message including the identity of the remote UE, performing, by the relay UE, a paging broadcasting operation on the received paging message through the paging relay resource pool, a paging occasion for the paging broadcasting operation complying with the paging occasions calculated in accordance with the DRX configuration parameter of the remote UE. The paging relay resource pool is allocated by the network device for the relay UE, and configured by the relay UE for the remote UE.

In yet another aspect, the present disclosure provides in some embodiments a paging processing device used in a remote UE, including: a determination module configured to, when the remote UE needs to monitor and/or receive a paging message through a paging relay, determine a relay UE corresponding to the remote UE, the relay UE being configured to monitor and/or receive the paging message transmitted by a network to the remote UE; a first establishment module configured to establish a paging relay connection between the remote UE and the relay UE; and a first processing module configured to, after the establishment of the paging relay connection, monitor and/or receive the paging message forwarded by the relay UE.

In a possible embodiment of the present disclosure, the first establishment module includes: a first connection establishment unit configured to establish a communication connection between the remote UE and the relay UE; a first transmission unit configured to, after the establishment of the communication connection, transmit a paging relay connection establishment request message to the relay UE; a first reception unit configured to receive a response message for a paging relay connection establishment request from the relay UE, the response message carrying a configuration parameter of a paging relay resource pool for forwarding the paging message allocated by a network device for the relay UE; a configuration unit configured to configure the paging relay resource pool in accordance with the configuration parameter, the paging relay resource pool being a reception resource pool through which the paging message is received by the remote UE from the relay UE; and a second transmission unit configured to transmit a paging relay configuration completion message to the relay UE.

In a possible embodiment of the present disclosure, an identity of the remote UE is carried in the paging relay connection establishment request message.

In a possible embodiment of the present disclosure, the identity of the remote UE is an S-TMSI of the remote UE.

In a possible embodiment of the present disclosure, a DRX configuration parameter of the remote UE is carried in the paging relay connection establishment request message, so that the relay UE is configured to calculate a paging occasion for monitoring the paging message for the remote UE in accordance with the DRX configuration parameter of the remote UE, and monitor the paging message for the remote UE at the paging occasion.

In a possible embodiment of the present disclosure, the paging processing device further includes a monitoring module configured to determine the paging occasion in accordance with the DRX configuration parameter of the remote UE, and monitor, at the paging occasion, the paging message in the paging relay resource pool configured in accordance with a paging relay configuration message.

In a possible embodiment of the present disclosure, the determination module is further configured to, when channel quality between the remote UE and a base station is smaller than a first threshold and channel quality between the remote UE and the relay UE is greater than a second threshold, determine that the remote UE monitors and/or receives the paging message through the paging relay.

In a possible embodiment of the present disclosure, the first threshold and the second threshold are configured by the network.

In a possible embodiment of the present disclosure, the determination module is further configured to, when a current coverage enhancement level of the remote UE is a predetermined coverage enhancement level, determine that the remote UE monitors and/or receives the paging message through the paging relay.

In a possible embodiment of the present disclosure, the predetermined coverage enhancement level is configured by the network.

In still yet another aspect, the present disclosure provides in some embodiments a paging processing device used in a relay UE, including: a second establishment module configured to establish a paging relay connection between the relay UE and a remote UE which needs to monitor and/or receive a paging message through a paging relay; and a second processing module configured to monitor and/or receive the paging message transmitted by a network to the remote UE, and forward the paging message to the remote UE.

In a possible embodiment of the present disclosure, the second establishment module includes: a second connection establishment unit configured to establish a communication connection between the relay UE and the remote UE; a second reception unit configured to, after the establishment of the communication connection, receive a paging relay connection establishment request message from the remote UE; a requesting unit configured to request a network device for a paging relay resource pool; a third transmission unit configured to transmit a response message for a paging relay connection establishment request to the remote UE, the response message carrying a configuration parameter of the paging relay resource pool for forwarding the paging message allocated by the network device for the relay UE, the remote UE being configured to configure the paging relay resource pool in accordance with the configuration parameter of the paging relay resource pool, the paging relay resource pool being a reception resource pool through which the paging message is received by the remote UE from the relay UE; and a third reception unit configured to receive a paging relay configuration completion message from the remote UE.

In a possible embodiment of the present disclosure, an identity of the remote UE is carried in the paging relay connection establishment request message.

In a possible embodiment of the present disclosure, the identity of the remote UE is an S-TMSI of the remote UE.

In a possible embodiment of the present disclosure, a DRX configuration parameter of the remote UE is carried in the paging relay connection establishment request message.

In a possible embodiment of the present disclosure, the second processing module includes: a monitoring unit configured to calculate a paging occasion for monitoring the paging message for the remote UE in accordance with the DRX configuration parameter of the remote UE, and monitoring the paging message for the remote UE at the paging occasion; and a paging unit configured to, upon the receipt of the paging message including the identity of the remote UE, perform a paging broadcasting operation on the received paging message through the paging relay resource pool, a paging occasion for the paging broadcasting operation complying with the paging occasions calculated in accordance with the DRX configuration parameter of the remote UE. The paging relay resource pool is allocated by the network device for the relay UE, and configured by the relay UE for the remote UE.

In still yet another aspect, the present disclosure provides in some embodiments a paging processing device used in a remote UE, including a processor, a memory and a transceiver. The processor is configured to read a program stored in the memory, so as to: when the remote UE needs to monitor and/or receive a paging message through a paging relay, determine a relay UE corresponding to the remote UE, the relay UE being configured to monitor and/or receive the paging message transmitted by a network to the remote UE; establish a paging relay connection between the remote UE and the relay UE; and after the establishment of the paging relay connection, monitor and/or receive the paging message forwarded by the relay UE. The transceiver is configured to receive and transmit data. The memory is configured to store therein data for the operation of the processor.

In still yet another aspect, the present disclosure provides in some embodiments a paging processing device used in a relay UE, including a processor, a memory and a transceiver. The processor is configured to read a program stored in the memory, so as to: establish a paging relay connection between the relay UE and a remote UE which needs to monitor and/or receive a paging message through a paging relay; and monitor and/or receive the paging message transmitted by a network to the remote UE, and forward the paging message to the remote UE. The transceiver is configured to receive and transmit data. The memory is configured to store therein data for the operation of the processor.

According to the embodiments of the present disclosure, through the scheme of monitoring and/or receiving the paging message from the network on the basis of a relay technology, the remote UE may monitor and/or receive the paging message through the relay UE. As a result, it is able for the off-line remote UE to receive and monitor the paging message when it has been registered in the network, and reduce the power consumption for the on-line UE in a coverage enhancement mode.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

The present disclosure will be described hereinafter in conjunction with the drawings and embodiments. The following embodiments are for illustrative purposes only, but shall not be used to limit the scope of the present disclosure. Actually, the embodiments are provided so as to facilitate the understanding of the scope of the present disclosure.

(1) D2D Proximity Service

A D2D technology, i.e., direct communication technology between UEs, refers to a technology where data is transmitted between the adjacent UEs within a short range through a direct link, rather than being forwarded by a central node (e.g., a base station), nor being transmitted through a conventional cellular data link.

As defined by the $3^{rd}$-Generation Partnership Project (3GPP), the D2D proximity service includes the following two types of services.

D2D find: one UE may determine that another UE is located in proximity to the UE through Evolved Universal Terrestrial Radio Access (E-UTRA). For example, a D2D UE may use this service to find a taxi or a friend located in proximity thereto.

Figure 1:
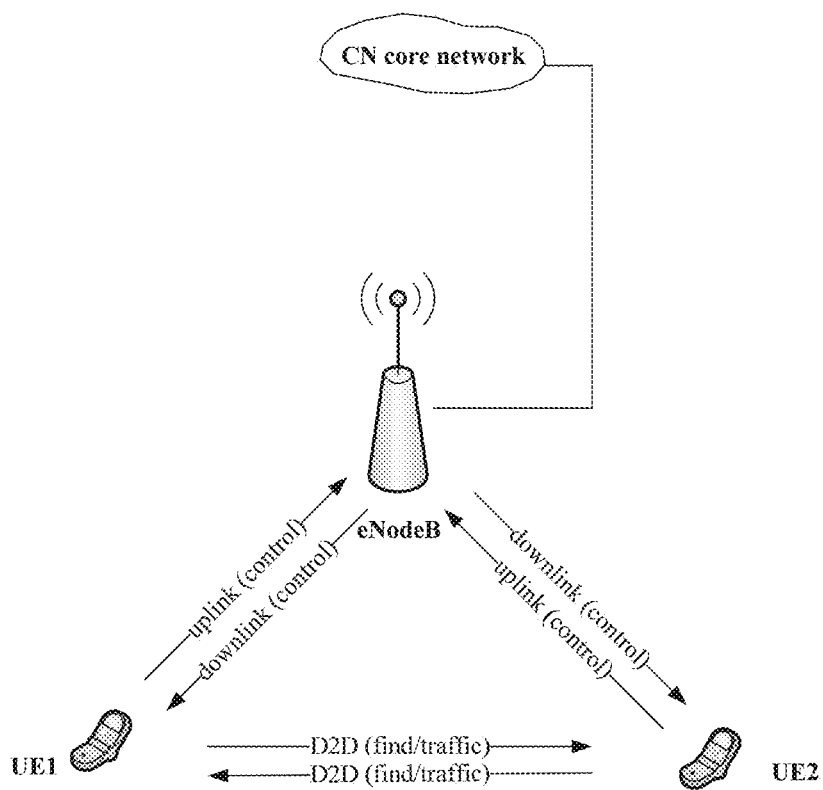
FIG. 1 is a schematic view showing D2D find/communication architecture.

D2D communication: a link may be directly established between two adjacent UEs (as shown in FIG. 1), so as to convert a communication link via a network into a local, direct communication link, thereby to remarkably reduce the bandwidth and improve the network efficiency. Alternatively, a stable, high-speed and cheap communication service may be provided for the two adjacent UEs through the direct link. Usually, the D2D communication is controlled or assisted by a network side device, and even an evolved Node B (eNB) may dynamically allocate resources for the D2D UEs.

For ease of description, two link types will be defined as follows: a D2D link which refers to a direct communication link between two devices, and a Device-to-Network (D2N) link which refers to a communication link between a device and a network node.

In addition, the UEs participating the D2D find/communication may include a D2D transmission UE (i.e., a UE which transmits a D2D find/communication message) and a D2D reception UE (i.e., a UE which receives the D2D find/communication message from the D2D transmission UE).

(2) UE-to-Network Relay

On the basis of the D2D find and communication technology, the data may be transmitted between the UE and the network through a relay. In a D2D system, a relay model from the UE to the network is UE-to-Network Relay.

Figure 2:
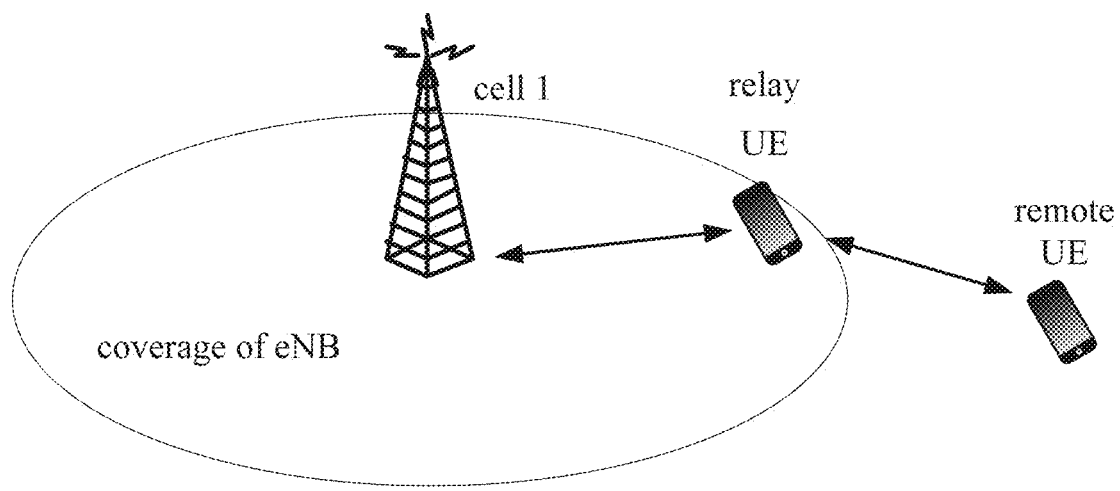
FIG. 2 is a schematic view showing UE-to-Network relay architecture.

To be specific, a mode in which the UE communicates with the network through a relay UE is called as UE-to-Network Relay, as shown in FIG. 2. In order to communicate with the network, a remote UE located beyond a coverage range of the network may transfer its own uplink/downlink signals by taking the relay UE as a relay node. The relay UE may communicate with the remote UE in a D2D communication mode, and the relay UE may communicate with the network in a cellular communication mode.

In the above scenario, a source UE needs to find the relay UE capable of relaying the data for the source UE itself, and this relay UE needs to communicate with the source UE and a target node simultaneously. The source UE may find the relay UE in a D2D find mode, and specifically there are the following two modes.

In a first mode, the relay UE may broadcast its own find signal carrying information indicating that the relay UE itself is capable of serving as a relay node. Upon the receipt of the find signal, the source UE may determine whether to select the relay UE to forward its own uplink/downlink signal.

In a second mode, the source UE may transmit a find request signal including information about the source UE itself and a target node. Upon the receipt of the find request signal, each neighboring UE may determine whether it is capable of serving as a relay UE between the source UE and the target node. When the neighboring UE is capable of serving as the relay UE, it may transmit a find response signal to the source UE. Upon the receipt of the find response signal, the source UE may determine whether to select the relay UE to forward its own uplink/downlink signal.

(3) L2 UE-to-Network Relay

Figure 3A:
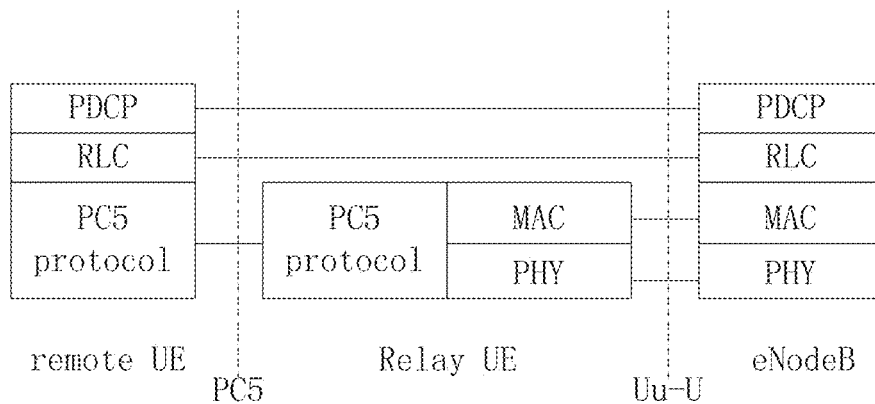
FIG. 3a is a schematic view showing a user plane for L2 UE-to-Network relay architecture.
Figure 3B:
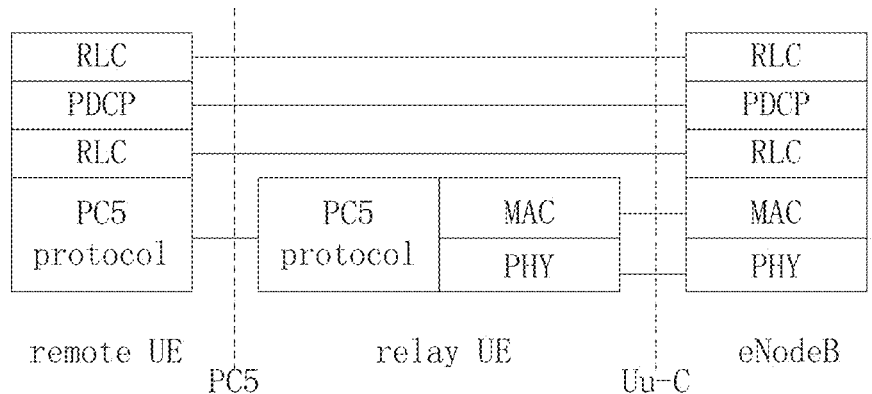
FIG. 3b is a schematic view showing a control plane for the L2 UE-to-Network relay architecture.

In conventional D2D UE-to-Network Relay architecture, it is impossible for the network to filter out services transmitted from the remote UE and forwarded by a relay node from the data transmitted from the relay node to the network, so L2 UE-to-Network Relay architecture has been introduced into an feD2D technology. Based on this, both the network and an operator may perform charging management and security control over the remote UE connected to the network via the relay UE as an independent LIE UE. FIGS. 3a and 3b show the L2 UE-to-Network Relay architecture.

Because there is an end-to-end Packet Data Convergence Protocol (PDCP) logic entity and an RRC logic entity between the remote UE and the base station, it is able for the network to manage the security and quality of service (QoS) of the remote UE on the basis of a data forwarding operation by the relay UE. In addition, the remote UE may be registered in the network as the independent LTE UE, and establish an RRC connection with the network.

A scenario where the remote UE accesses to the network via the relay UE has also been defined in the feD2D technology, i.e., the on-line remote UE is connected to the on-line relay UE, or the off-line remote UE is connected to the on-line relay UE. After the establishment of the connection of the on-line relay UE and the network, the relay UE is capable of forwarding the data to be transmitted between the remote UE and the network. A PC5 connection may be established between the remote UE and the relay UE for the D2D communication, and the relay UE may communicate with the network via a Uu interface.

A mechanism where the off-line remote UE is registered in the network via the relay UE has been introduced into the feD2D technology. In a current LTE system, the UE which has been registered in the network needs to receive a paging message. However, it is impossible for the off-line UE to directly monitor the paging message from the network. The transmission and forwarding of the paging message is not supported by the conventional D2D communication relay technology. In addition, when the UE communicates with the network through the relay, it is able to reduce the power consumption and improve the channel quality. However, there is currently no scheme for enabling the UE to receive the paging message through the relay technology.

An object of the present disclosure is to provide a method and a device, so as to enable a UE to monitor and/or receive a paging message from a network through a relay technology, so as to solve the problem that UE cannot receive a paging message through a relay technology.

It should be appreciated that, the present disclosure may be provided as a system, a device, equipment, a method or a computer program product, so the present disclosure may be implemented in the form of hardware, software (including firmware, resident software or microcode), or combinations thereof.

Figure 4:
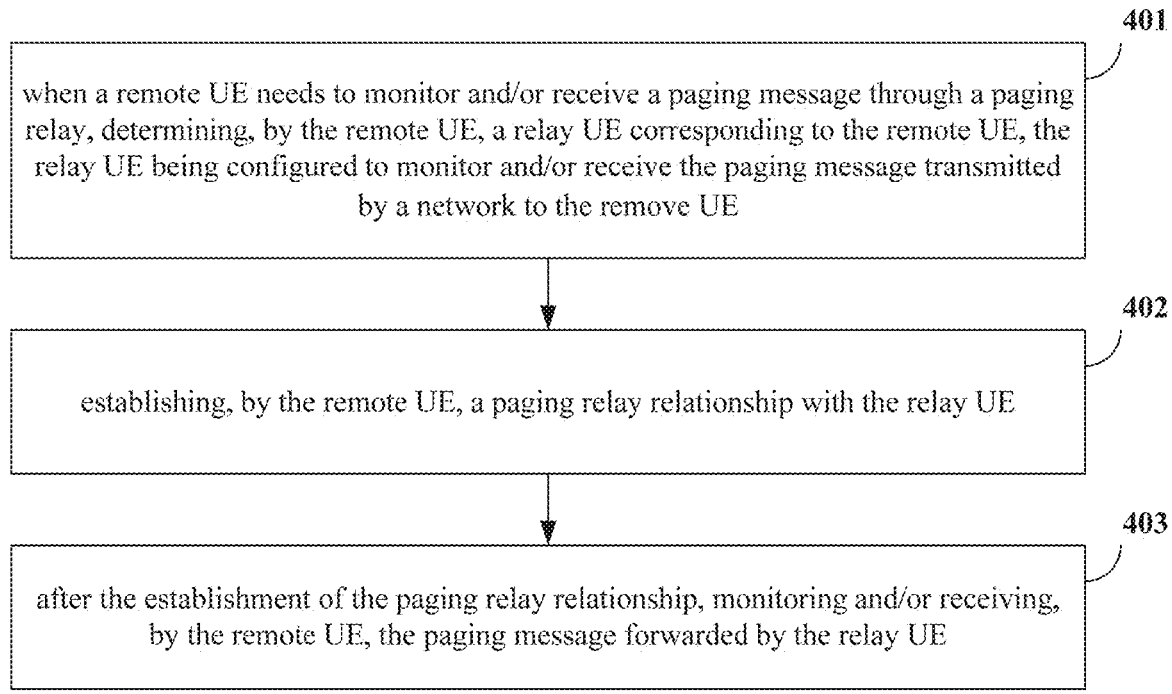
FIG. 4 is a flow chart of a paging processing method according to one embodiment of the present disclosure.

As shown in FIG. 4, the present disclosure provides in some embodiments a paging processing method which includes the following steps.

Step 401: when a remote UE needs to monitor and/or receive a paging message through a paging relay, determining, by the remote UE, a relay UE corresponding to the remote UE, the relay UE being configured to monitor and/or receive the paging message transmitted by a network to the remote UE.

The so-called "monitoring and/or receiving the paging message through the paging relay" refers to that an on-line remote UE or an off-line remote UE is connected to an on-line relay UE and then monitor and/or receive the paging message through the on-line relay UE after the on-line relay UE has been connected to the network.

For example, when the remote UE is the off-line remote UE which has been registered in the network, the remote UE may monitor and/or receive the paging message through the paging relay.

For example, when channel quality between the remote UE (the on-line remote UE) and a base station is smaller than a first threshold and channel quality between the remote UE and the relay UE is greater than a second threshold, the remote UE may monitor and/or receive the paging message through the paging relay. It should be appreciated that, the first threshold and the second threshold may be both configured by the network.

For example, when a current coverage enhancement level of the remote UE (the on-line remote UE) is a predetermined coverage enhancement level, the remote UE may monitor and/or receive the paging message through the paging relay. It should be appreciated that, the predetermined coverage enhancement level may be configured by the network.

Step 402: establishing, by the remote UE, a paging relay connection with the relay UE.

The remote UE may establish the paging relay connection with the relay UE as follows.

The remote UE may establish a communication connection with the relay UE, and after the establishment of the communication connection, the remote UE may transmit a paging relay connection establishment request message to the relay UE. Next, the remote UE may receive a response message for a paging relay connection establishment request from the relay UE, and a configuration parameter of a paging relay resource pool for forwarding the paging message allocated by a network device (e.g., the base station) for the relay UE. Next, the remote UE may configure the paging relay resource pool in accordance with the configuration parameter, and the paging relay resource pool may be a reception resource pool through which the paging message is received by the remote UE from the relay UE. Then, the remote UE may transmit a paging relay configuration completion message to the relay UE. Through the above steps, the paging relay connection may be established between the remote UE and the relay UE.

In the embodiments of the present disclosure, an identity, e.g., an S-TMSI, of the remote UE may be carried in the paging relay connection establishment request, so that the relay UE may identify the paging message to be forwarded in accordance with the identity of the remote UE.

In the embodiments of the present disclosure, a DRX configuration parameter of the remote UE may be carried in the paging relay connection establishment request, so that the relay UE may calculate paging occasions for monitoring the paging message for the remote UE in accordance with the DRX configuration parameter of the remote UE, and monitor the paging message for the remote UE at a corresponding paging occasion.

Step 403: after the establishment of the paging relay connection, monitoring and/or receiving, by the remote UE, the paging message forwarded by the relay UE.

According to the paging processing method in the embodiments of the present disclosure, it is able for the remote UE to monitor and/or receive the paging message from the network through the relay UE, especially prevent the occurrence of such a situation where the off-line remote UE is capable of being registered in the network but incapable of monitoring and receiving the paging message, and reduce the power consumption of the on-line remote UE in a coverage enhancement mode.

Figure 5:
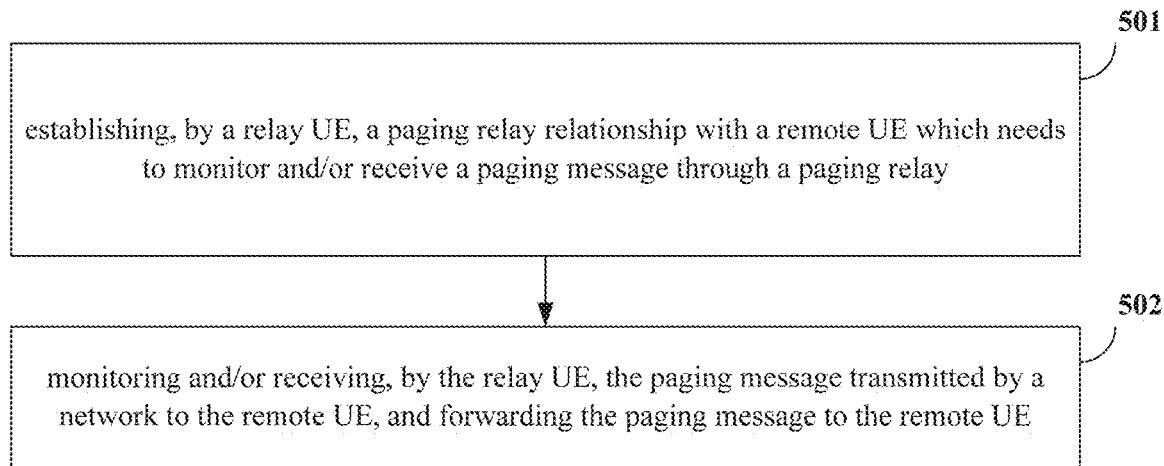
FIG. 5 is a flow chart of another paging processing method according to one embodiment of the present disclosure.

As shown in FIG. 5, the present disclosure further provides in some embodiments a paging processing method which includes the following steps.

Step 501: establishing, by a relay UE, a paging relay connection with a remote UE which needs to monitor and/or receive a paging message through a paging relay.

The relay UE may establish a communication connection with the remote UE, and after the establishment of the communication connection, the relay UE may receive a paging relay connection establishment request message from the remote UE. Next, the relay UE may request a network device for a paging relay resource pool and transmit a response message for a paging relay connection establishment request to the remote UE. A configuration parameter of the paging relay resource pool for forwarding the paging message allocated by the network device for the relay UE may be carried in the response message, so that the remote UE is configured to configure the paging relay resource pool in accordance with the configuration parameter of the paging relay resource pool. The paging relay resource pool may be a reception resource pool through which the paging message is received by the remote UE from the relay UE. Then, the relay UE may receive a paging relay configuration completion message from the remote UE.

In the embodiments of the present disclosure, an identity, e.g., an S-TMSI, of the remote UE may be carried in the paging relay connection establishment request message.

In the embodiments of the present disclosure, a DRX configuration parameter of the remote UE may be further carried in the paging relay connection establishment request message.

Step 502: monitoring and/or receiving, by the relay UE, the paging message transmitted by a network to the remote UE, and forwarding the paging message to the remote UE.

To be specific, the relay UE may calculate paging occasions for monitoring the paging message for the remote UE in accordance with the DRX configuration parameter of the remote UE, and monitor the paging message for the remote UE at a corresponding paging occasion. Upon the receipt of the paging message including the identity of the remote UE, the relay UE may perform a paging broadcasting operation on the received paging message through the paging relay resource pool, and a paging occasion for the paging broadcasting operation may follow the paging occasions calculated in accordance with the DRX configuration parameter of the remote UE. The paging relay resource pool may be allocated by the network device for the relay UE, and configured by the relay UE for the remote UE.

According to the paging processing method in the embodiments of the present disclosure, it is able for the remote UE to monitor and/or receive the paging message from the network through the relay UE, especially prevent the occurrence of such a situation where the off-line remote UE is capable of being registered in the network but incapable of monitoring and receiving the paging message, and reduce the power consumption of the on-line remote UE in a coverage enhancement mode.

Application scenarios for the paging relay will be described as follows.

Scenario 1: an off-line remote UE which has been registered in the network is incapable of directly monitoring and/or receiving the paging message from a base station, so it must monitor and/or receive the paging message from the base station through the paging relay.

Scenario 2: when an on-line remote UE in a coverage enhancement mode communicates with the base station, each message needs to be re-transmitted for several times, so as to acquire a combination gain and ensure a transmission success rate. When the remote UE directly monitors and/or receives the paging message from the base station, relatively large power consumption may occur. In order to reduce the power consumption, the remote UE may monitor and/or receive the paging message through the paging relay.

In the embodiments of the present disclosure, a relationship between a coverage enhancement level of the remote UE and a paging message reception mode may be configured by the network.

(1). As configured by the network, the remote UE at a first coverage enhancement level needs to directly monitor and/or receive the paging message from the base station. It should be appreciated that, the first coverage enhancement level will not be particularly defined herein.

(2). As configured by the network, the remote UE at a second coverage enhancement level needs to monitor and/or receive the paging message through the paging relay. It should be appreciated that, the second coverage enhancement level will not be particularly defined herein.

(3). The on-line remote UE may select a mode for receiving and monitoring the paging message in accordance with the current coverage enhancement level.

Scenario 3: when channel quality when the on-line remote UE directly communicating with the network is smaller than a first threshold and channel quality when the on-line remote UE communicating with the network through the relay UE is greater than a second threshold, the remote UE needs to monitor and/or receive the paging message through the paging relay. It should be appreciated that, the first threshold and the second threshold will not be particularly defined herein, and they may be configured by the network.

Figure 6:
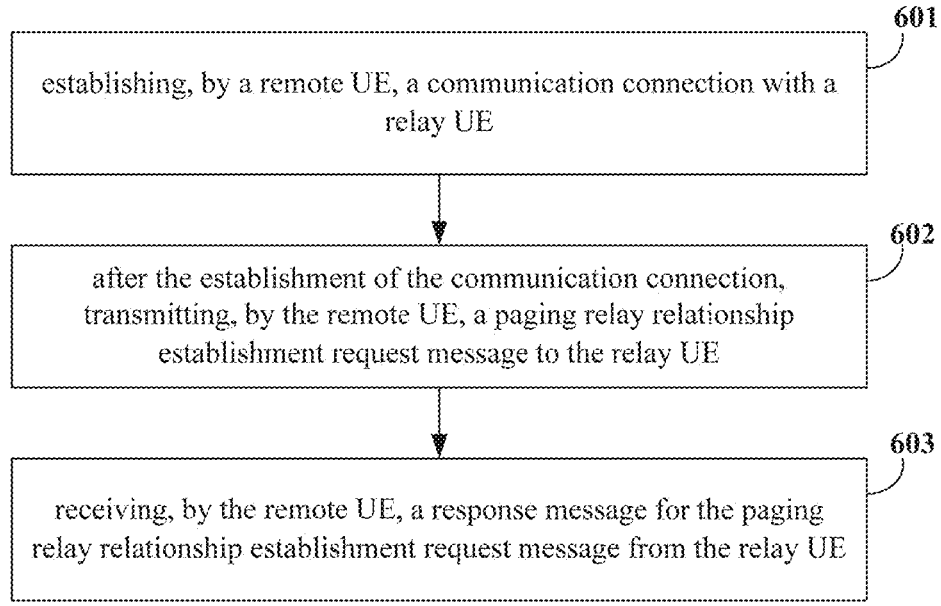
FIG. 6 is a flow chart of the establishment of a paging relay connection according to one embodiment of the present disclosure.

FIG. 6 shows a procedure of the establishment of the paging relay connection. When the remote UE needs to monitor and/or receive the paging message through the paging relay, it needs to find a relay UE and establish the paging relay connection with the relay UE through the following steps.

Step 601: establishing, by the remote UE, a communication connection with the relay UE.

For example, the remote UE may select an appropriate relay UE through a relay find and selection process in a relevant protocol, and establish a one-to-one sidelink connection with the relay UE.

Step 602: after the establishment of the communication connection, transmitting, by the remote UE, a paging relay connection establishment request message to the relay UE.

For example, after the establishment of the one-to-one sidelink connection, the remote UE may transmit the paging relay connection establishment request message to the relay UE.

Step 603: receiving, by the remote UE, a response message for the paging relay connection establishment request message from the relay UE.

Upon the receipt of the paging relay connection establishment request message, the relay UE may transmit the response message for the paging relay connection establishment request message to the remote UE. Through the above steps, the paging relay connection between the remote UE and the relay UE may be established.

During the transmission of the paging message, the network device may collect paging contents for the UE having a same paging occasion into one paging message, and the S-TMSI of the to-be-paged UE may be carried in the paging message. Hence, when the paging message has been monitored, the remote UE may parse the S-TMSI, so as to determine whether the paging content for the remote UE itself is contained in a certain paging message.

The relay UE which has established the paging relay connection with the remote UE needs to read and forward the paging contents for the remote UE, so it must know the S-TMSI of the remote UE. In a possible embodiment of the present disclosure, the S-TMSI of the remote UE may be carried in the paging relay connection establishment request message to be transmitted to the remote UE.

In the embodiments of the present disclosure, after the establishment of the paging relay connection between the relay UE and a certain remote UE, the relay UE needs to monitor the paging message for the remote UE.

In an LTE system, the transmission and reception of the paging message may follow a DRX principle. In order to reduce the power consumption, the UE may merely monitor the paging message at a specific PO in accordance with the DRX configuration, and meanwhile an evolved Node B (eNB) may merely transmit the paging message to the UE at a corresponding PO. The PO may be obtained by calculation based on the DRX configuration. The DRX configuration of the UE is stored at the eNB, so the UE and the eNB may understood the PO in a similar way.

In the embodiments of the present disclosure, in the case of the paging relay, the eNB needs to determine whether to follow the DRX configuration of the relay UE or the DRX configuration of the remote UE during the transmission of the paging message for the remote UE. Regardless of any DRX configurations, it is able for the relay UE to monitor the paging message for the remote UE, with some improvements and enhancements on a paging mechanism of the relay UE or the network.

Figure 7:
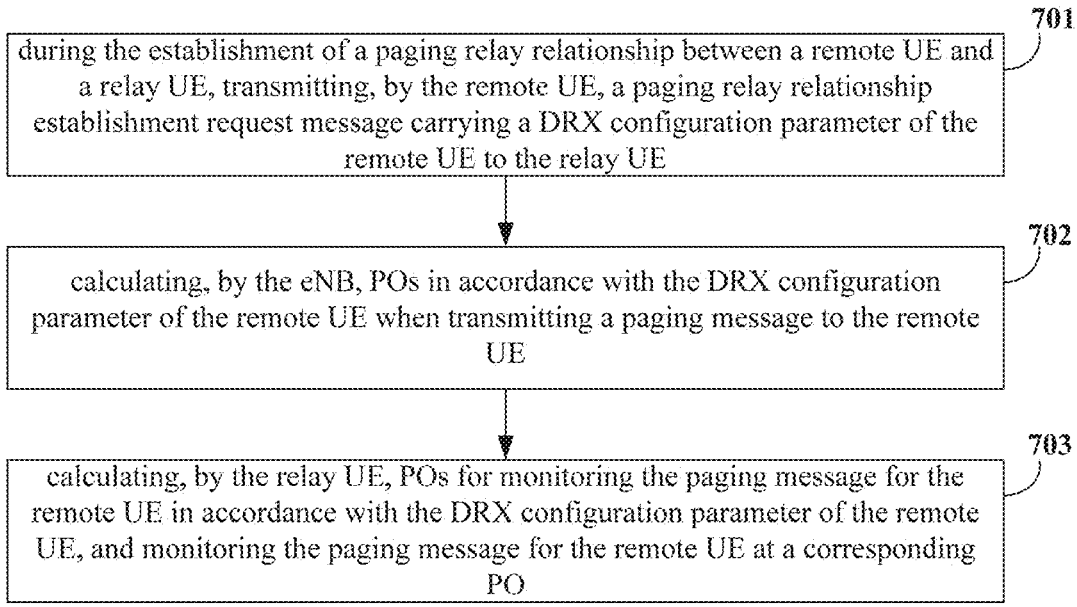
FIG. 7 is a flow chart of the transmission of paging message for a remote UE by a network to a relay UE according to one embodiment of the present disclosure.

As shown in FIG. 7, a procedure of transmitting, by the network, the paging message for the remote UE to the relay UE may include the following steps.

Step 701: during the establishment of the paging relay connection between the remote UE and the relay UE, transmitting, by the remote UE, the paging relay connection establishment request message carrying the DRX configuration parameter of the remote UE to the relay UE.

Step 702: calculating, by the eNB, POs in accordance with the DRX configuration parameter of the remote UE when transmitting the paging message to the remote UE.

Step 703: calculating, by the relay UE, POs for monitoring the paging message for the remote UE in accordance with the DRX configuration parameter of the remote UE, and monitoring the paging message for the remote UE at a corresponding PO.

In the feD2D technology, the relay UE may communicate with the remote UE in a PC5 unicasting mode or a PC5 broadcasting mode. The remote UE in an RRC idle state needs to receive the paging message from the network, but does not need to maintain a one-to-one connection with the relay UE. In addition, in the LTE system, the paging message may be a broadcast message, and it is unnecessary to transmit the paging message through an L2 connection whose security has been activated. Hence, the relay UE may forward the paging message in a PC5 broadcasting mode.

Figure 8:
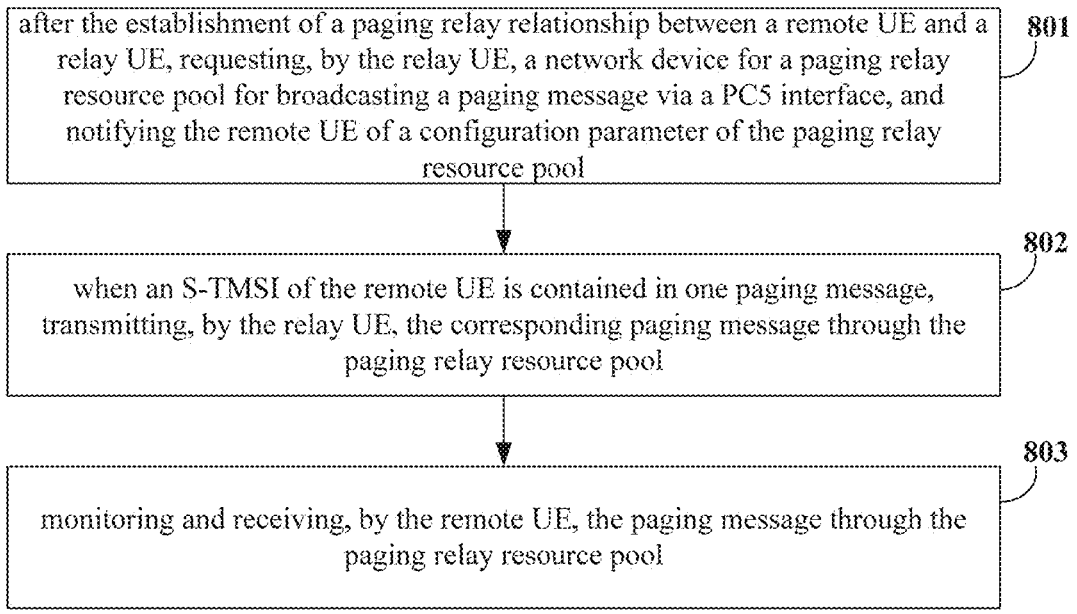
FIG. 8 is a flow chart of the forwarding of the paging message by the relay UE to the remote UE according to one embodiment of the present disclosure.

FIG. 8 shows the forwarding, by the relay UE, the paging message to the remote UE through the following steps.

Step 801: after the establishment of the paging relay connection between the remote UE and the relay UE, requesting, by the relay UE, the network device for the paging relay resource pool for broadcasting the paging message via a PC5 interface, and notifying the remote UE of a configuration parameter of the paging relay resource pool.

Step 802: when the relay UE receives one paging message including the S-TMSI of the remote UE, transmitting, by the relay UE, the corresponding paging message through the paging relay resource pool.

Step 803: monitoring and receiving, by the remote UE, the paging message through the paging relay resource pool.

In order to reduce the power consumption for the remote UE, a procedure of transmitting and monitoring the paging message between the relay UE and the remote UE may follow a DRX principle. During the establishment of the paging relay connection between the remote UE and the relay UE, the remote UE may notify the relay UE of its own DRX configuration parameter.

Scenario 1

A certain remote UE which needs to monitor and/or receive a paging message through the paging relay may find an appropriate relay UE through a relay find process, and then establish a paging relay connection with the found relay UE.

Figure 9:
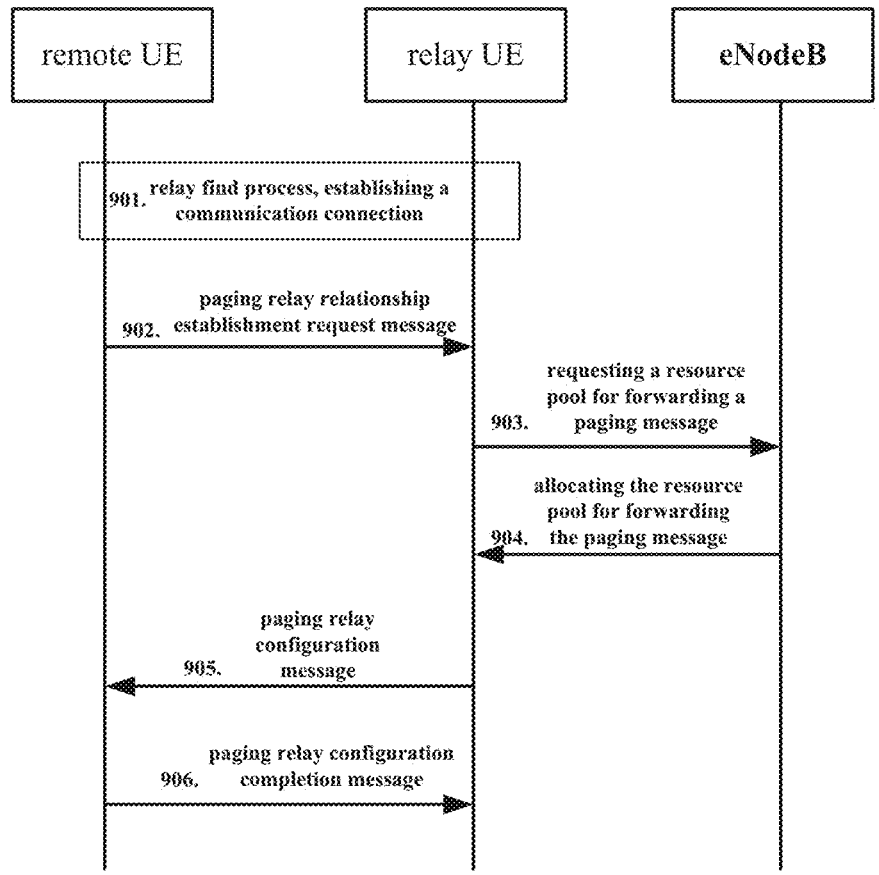
FIG. 9 is another flow chart of the establishment of the paging relay connection according to one embodiment of the present disclosure.

FIG. 9 shows a procedure of establishing the paging relay connection through the following steps.

Step 901: finding, by the remote UE, an appropriate relay UE through a relay find process and establishing a communication connection with the found relay UE.

Step 902: transmitting, by the remote UE, a paging relay connection establishment request message to the relay UE, and the paging relay connection establishment request message carrying an S-TMSI and a DRX configuration parameter of the remote UE.

Step 903: upon the receipt of the paging relay establishment request message in Step 902, requesting, by the relay UE, the eNB for a paging relay resource pool for forwarding the paging message.

Step 904: upon the receipt of a request from the relay UE in Step 903, allocating, by the eNB, the paging relay resource pool for the relay UE.

Step 905: upon the receipt of the paging relay resource pool allocated by the eNB in Step 904, transmitting, by the relay UE, a paging relay configuration message to the remote UE, the paging relay configuration message carrying a configuration parameter of the paging relay resource pool allocated by the eNB.

Step 906: upon the receipt of the paging relay configuration message and the acquisition of the configuration parameter of the paging relay resource pool, transmitting, by the remote UE, a paging relay configuration completion message to the relay UE. Through the above steps, the paging relay connection may be established between the remote UE and the relay UE.

It should be appreciated that, the relay UE may take the paging relay resource pool as a transmission resource pool for forwarding the paging message for the remote UE, and the remote UE may take the paging relay resource pool as a reception resource pool for receiving the paging message forwarded by the relay UE, Scenario 2

After the establishment of the paging relay connection, the relay UE may monitor the paging message at the PO for the remote UE, and forward the paging message to the remote UE.

Figure 10:
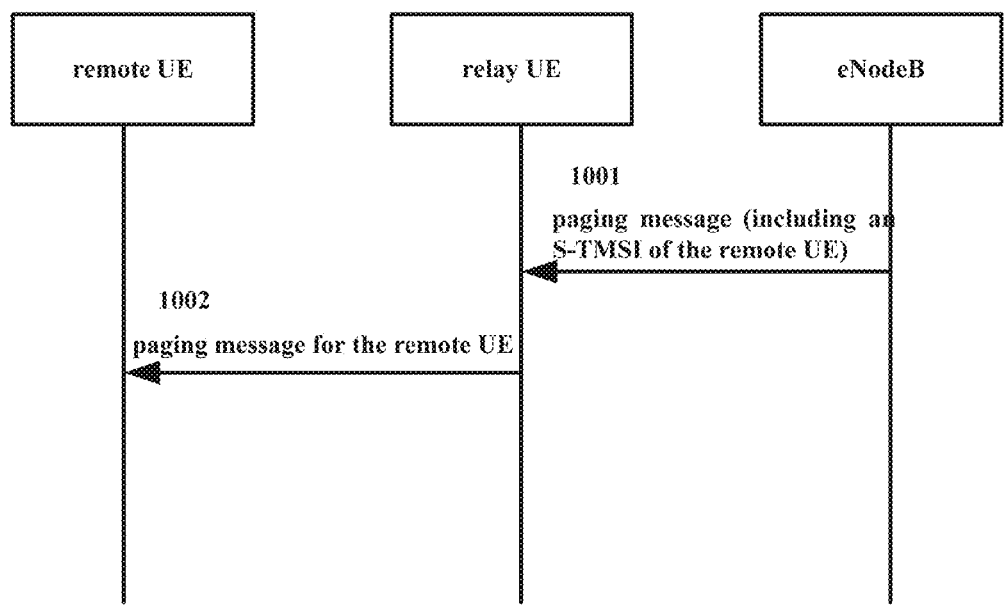
FIG. 10 is another flow chart of the forwarding of the paging message by the relay UE to the remote UE according to one embodiment of the present disclosure.

FIG. 10 shows a procedure of forwarding, by the relay UE, the paging message to the remote UE through the following steps.

Step 1001: monitoring, by the relay UE, the paging message at a PO for the remote UE, and determining whether the S-TMSI of the remote UE is carried in the paging message received at the PO.

Step 1002: upon the receipt of the paging message including the S-TMSI of the remote UE, transmitting, by the relay UE, corresponding paging contents at the PO for the remote UE through the paging relay resource pool. At this time, the remote UE may monitor and/or receive the paging message at its own PO through the paging relay resource pool.

According to the embodiments of the present disclosure, the remote UE may monitor and/or receive the paging message from the network through the relay UE. As a result, it is able for the off-line remote UE to receive and monitor the paging message when it has been registered in the network, and reduce the power consumption for the on-line remote UE in a coverage enhancement mode.

Figure 11:
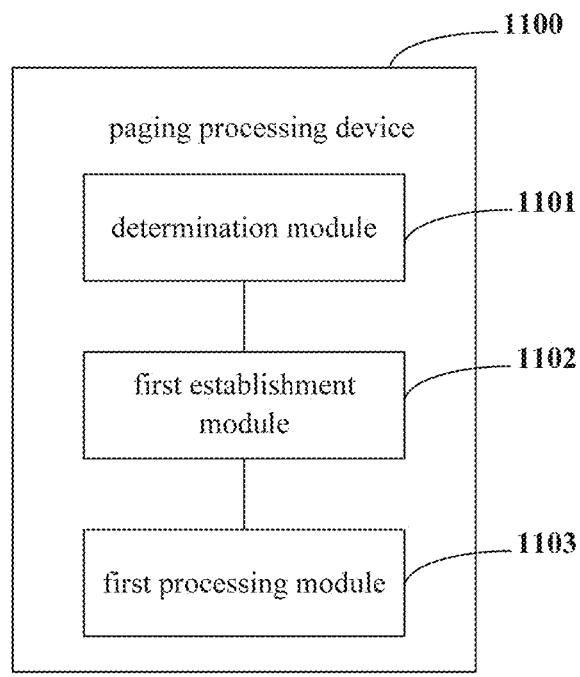
FIG. 11 is a block diagram of a paging processing device according to one embodiment of the present disclosure.

As shown in FIG. 11, the present disclosure further provides in some embodiments a paging processing device 1100 for use in a remote UE, which includes: a determination module 1101 configured to, when the remote UE needs to monitor and/or receive a paging message through a paging relay, determine a relay UE corresponding to the remote UE, the relay UE being configured to monitor and/or receive the paging message transmitted by a network to the remote UE; a first establishment module 1102 configured to establish a paging relay connection between the remote UE and the relay UE; and a first processing module 1103 configured to, after the establishment of the paging relay connection, monitor and/or receive the paging message forwarded by the relay UE.

In a possible embodiment of the present disclosure, the first establishment module 1102 may include: a first connection establishment unit configured to establish a communication connection between the remote UE and the relay UE; a first transmission unit configured to, after the establishment of the communication connection, transmit a paging relay connection establishment request message to the relay UE; a first reception unit configured to receive a response message for a paging relay connection establishment request from the relay UE, the response message carrying a configuration parameter of a paging relay resource pool for forwarding the paging message allocated by a network device for the relay UE; a configuration unit configured to configure the paging relay resource pool in accordance with the configuration parameter, the paging relay resource pool being a reception resource pool through which the paging message is received by the remote UE from the relay UE, and a second transmission unit configured to transmit a paging relay configuration completion message to the relay UE.

In a possible embodiment of the present disclosure, an identity of the remote UE may be carried in the paging relay connection establishment request message.

In a possible embodiment of the present disclosure, the identity of the remote UE may be an S-TMSI of the remote UE.

In a possible embodiment of the present disclosure, a DRX configuration parameter of the remote UE may be carried in the paging relay connection establishment request message, so that the relay UE is configured to calculate paging occasions for monitoring the paging message for the remote UE in accordance with the DRX configuration parameter of the remote UE, and monitor the paging message for the remote UE at a corresponding paging occasion.

In a possible embodiment of the present disclosure, the paging processing device may further include a monitoring module configured to determine the paging occasion in accordance with the DRX configuration parameter, and monitor, at the paging occasion, the paging message in the paging relay resource pool configured in accordance with a paging relay configuration message.

In a possible embodiment of the present disclosure, the determination module 1101 is further configured to, when channel quality between the remote UE and a base station is smaller than a first threshold and channel quality between the remote UE and the relay UE is greater than a second threshold, determine that the remote UE monitors and/or receives the paging message through the paging relay.

In a possible embodiment of the present disclosure, the first threshold and the second threshold may be configured by the network.

In a possible embodiment of the present disclosure, the determination module is further configured to, when a current coverage enhancement level of the remote UE is a predetermined coverage enhancement level, determine that the remote UE monitors and/or receives the paging message through the paging relay.

In a possible embodiment of the present disclosure, the predetermined coverage enhancement level may be configured by the network.

According to the embodiments of the present disclosure, the remote UE may monitor and/or receive the paging message from the network through the relay UE. As a result, it is able for the off-line remote UE to receive and monitor the paging message when it has been registered in the network, and reduce the power consumption for the on-line remote UE in a coverage enhancement mode.

Figure 12:
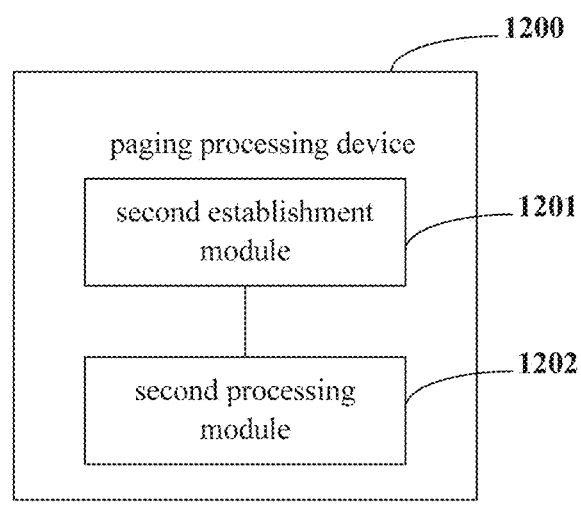
FIG. 12 is a block diagram of another paging processing device according to one embodiment of the present disclosure.

As shown in FIG. 12, the present disclosure further provides in some embodiments a paging processing device 1200 for use in a relay UE, which includes: a second establishment module 1201 configured to establish a paging relay connection between the relay UE and a remote UE which needs to monitor and/or receive a paging message through a paging relay; and a second processing module 1202 configured to monitor and/or receive the paging message transmitted by a network to the remote UE, and forward the paging message to the remote UE.

In a possible embodiment of the present disclosure, the second establishment module 1201 may include: a second connection establishment unit configured to establish a communication connection between the relay UE and the remote UE; a second reception unit configured to, after the establishment of the communication connection, receive a paging relay connection establishment request message from the remote UE; a requesting unit configured to request a network device for a paging relay resource pool; a third transmission unit configured to transmit a response message for a paging relay connection establishment request to the remote UE, the response message carrying a configuration parameter of the paging relay resource pool for forwarding the paging message allocated by the network device for the relay UE, the remote UE being configured to configure the paging relay resource pool in accordance with the configuration parameter of the paging relay resource pool, the paging relay resource pool being a reception resource pool through which the paging message is received by the remote UE from the relay UE; and a third reception unit configured to receive a paging relay configuration completion message from the remote UE.

In a possible embodiment of the present disclosure, an identity of the remote UE may be carried in the paging relay connection establishment request message.

In a possible embodiment of the present disclosure, the identity of the remote UE may be an S-TMSI of the remote UE.

In a possible embodiment of the present disclosure, a DRX configuration parameter of the remote UE may be carried in the paging relay connection establishment request message.

In a possible embodiment of the present disclosure, the second processing module 1202 may include: a monitoring unit configured to calculate paging occasions for monitoring the paging message for the remote UE in accordance with the DRX configuration parameter of the remote UE, and monitoring the paging message for the remote UE at a corresponding paging occasion; and a paging unit configured to, upon the receipt of the paging message including the identity of the remote UE, perform a paging broadcasting operation on the received paging message through the paging relay resource pool, a paging occasion for the paging broadcasting operation following the paging occasions calculated in accordance with the DRX configuration parameter of the remote UE. The paging relay resource pool may be allocated by the network device for the relay UE, and configured by the relay UE for the remote UE.

According to the embodiments of the present disclosure, the remote UE may monitor and/or receive the paging message from the network through the relay UE. As a result, it is able for the off-line remote UE to receive and monitor the paging message when it has been registered in the network, and reduce the power consumption for the on-line remote UE in a coverage enhancement mode.

It should be further appreciated that, such phrases as "one embodiment" and "one of the embodiments" intend to indicate that the features, structures or characteristics are contained in at least one embodiment of the present disclosure, rather than referring to a same embodiment. In addition, the features, structures or characteristics may be combined in any embodiment or embodiments in an appropriate manner.

It should be further appreciated that, serial numbers of the steps shall not be used to define the order of the steps, and instead, the order of the steps shall be determined in accordance with their functions and internal logics.

In addition, the terms "system" and "network" may be replaced with each other.

It should be further appreciated that, the expression "and/or" is merely used to describe the relationship between objects, and it includes three relationships. For example, "A and/or B" may represent that, there is only A, there are both A and B, and there is only B. Further, the symbol "/" usually refers to "or".

It should be further appreciated that, the expression "B corresponding to A" means that B is associated with A and may be determined in accordance A. However, when B is determined in accordance with A, it means that B may be determined in accordance with A and/or any other information.

It should be further appreciated that, the device and method may be implemented in any other ways. For example, the embodiments for the apparatus is merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or t may be implemented in an electrical or mechanical form or in any other form.

In addition, the functional units in the embodiments of the present disclosure may be integrated into a processing unit, or the functional units may exist independently, or two or more functional units may be combined together. These units may be implemented in the form of hardware, or hardware plus software.

The functional units implemented in a software form may be stored in a computer-readable medium. These software functional units may be stored in a storage medium and include several instructions so as to enable a computer device (a personal computer, a server or network device) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A paging processing method, comprising:
    determining, by a remote User Equipment (UE), a relay UE corresponding to the remote UE when the remote UE needs to monitor and/or receive a paging message through a paging relay, the relay UE being configured to monitor and/or receive the paging message transmitted by a network to the remote UE;
    establishing, by the remote UE, a paging relay connection with the relay UE; and
    monitoring and/or receiving, by the remote UE, the paging message forwarded by the relay UE after the establishment of the paging relay connection,
    wherein the establishing, by the remote UE, the paging relay connection with the relay UE comprises:
    establishing, by the remote UE, a communication connection with the relay UE;
    transmitting, by the remote UE, a paging relay connection establishment request message to the relay UE after the establishment of the communication connection;
    receiving, by the remote UE, a response message for a paging relay connection establishment request from the relay UE, the response message carrying a configuration parameter of a paging relay resource pool for forwarding the paging message allocated by a network device for the relay UE;
    configuring, by the remote UE, the paging relay resource pool in accordance with the configuration parameter of the paging relay resource pool, the paging relay resource pool being a reception resource pool through which the paging message is received by the remote UE from the relay UE; and
    transmitting, by the remote UE, a paging relay configuration completion message to the relay UE.

2. The paging processing method according to claim 1, wherein a Discontinuous Reception (DRX) configuration parameter of the remote UE is carried in the paging relay connection establishment request message, and the relay UE is configured to calculate paging occasions for monitoring the paging message for the remote UE in accordance with the DRX configuration parameter of the remote UE, and monitor the paging message for the remote UE at a corresponding paging occasion.

3. The paging processing method according to claim 2, further comprising: determining, by the remote UE, the paging occasion in accordance with the DRX configuration parameter, and monitoring, at the paging occasion, the paging message in the paging relay resource pool configured in accordance with a paging relay configuration message.

4. The paging processing method according to claim 1, further comprising: monitoring and/or receiving, by the remote UE, the paging message through the paging relay when channel quality between the remote UE and a base station is smaller than a first threshold and channel quality between the remote UE and the relay UE is greater than a second threshold.

5. The paging processing method according to claim 1, further comprising: monitoring and/or receiving, by the remote UE, the paging message through the paging relay when a current coverage enhancement level of the remote UE is a predetermined coverage enhancement level.

6. A paging processing method, comprising:
    establishing, by a relay UE, a paging relay connection with a remote UE which needs to monitor and/or receive a paging message through a paging relay; and
    monitoring and/or receiving, by the relay UE, the paging message transmitted by a network to the remote UE, and forwarding the paging message to the remote UE,
    wherein the establishing, by the relay UE, the paging relay connection with the remote UE comprises:
    establishing, by the relay UE, a communication connection with the remote UE;
    receiving, by the relay UE, a paging relay connection establishment request message from the remote UE after the establishment of the communication connection;
    requesting, by the relay UE, a network device for a paging relay resource pool;
    transmitting, by the relay UE, a response message for a paging relay connection establishment request to the remote UE, the response message carrying a configuration parameter of the paging relay resource pool for forwarding the paging message allocated by the network device for the relay UE, the remote UE being configured to configure the paging relay resource pool in accordance with the configuration parameter of the paging relay resource pool, the paging relay resource pool being a reception resource pool through which the paging message is received by the remote UE from the relay UE; and
    receiving, by the relay UE, a paging relay configuration completion message from the remote UE.

7. The paging processing method according to claim 6, wherein a DRX configuration parameter of the remote UE is carried in the paging relay connection establishment request message.

8. The paging processing method according to claim 7, wherein the monitoring and/or receiving, by the relay UE, the paging message for the remote UE from the network and forwarding the paging message to the remote UE comprises:
    calculating, by the relay UE, paging occasions for monitoring the paging message for the remote UE in accordance with the DRX configuration parameter of the remote UE, and monitoring the paging message for the remote UE at a corresponding paging occasion; and performing, by the relay UE, a paging broadcasting operation on the received paging message through the paging relay resource pool upon the receipt of the paging message comprising the identity of the remote UE, a paging occasion for the paging broadcasting operation complying with the paging occasions calculated in accordance with the DRX configuration parameter of the remote UE, wherein the paging relay resource pool is allocated by the network device for the relay UE, and configured by the relay UE for the remote UE.

9. A paging processing device used in a relay user equipment (UE), comprising a processor, a memory and a transceiver, wherein the processor is configured to: implement the paging processing method according to claim 6, the transceiver is configured to receive and transmit data, and the memory is configured to store therein data for the operation of the processor.

10. The paging processing device according to claim 9, wherein a Discontinuous Reception (DRX) configuration parameter of the remote UE is carried in the paging relay connection establishment request message, and the relay UE is configured to calculate paging occasions for monitoring the paging message for the remote UE in accordance with the DRX configuration parameter of the remote UE, and monitor the paging message for the remote UE at a corresponding paging occasion.

11. The paging processing device according to claim 9, wherein the processor is further configured for: determining, by the remote UE, the paging occasion in accordance with the DRX configuration parameter, and monitoring, at the paging occasion, the paging message in the paging relay resource pool configured in accordance with a paging relay configuration message.

12. The paging processing device according to claim 9, wherein a DRX configuration parameter of the remote UE is carried in the paging relay connection establishment request message.

13. The paging processing device according to claim 12, wherein the processor is further configured for:

calculating, by the relay UE, paging occasions for monitoring the paging message for the remote UE in accordance with the DRX configuration parameter of the remote UE, and monitoring the paging message for the remote UE at a corresponding paging occasion; and performing, by the relay UE, a paging broadcasting operation on the received paging message through the paging relay resource pool upon the receipt of the paging message comprising the identity of the remote UE, a paging occasion for the paging broadcasting operation complying with the paging occasions calculated in accordance with the DRX configuration parameter of the remote UE, wherein the paging relay resource pool is allocated by the network device for the relay UE, and configured by the relay UE for the remote UE.

14. A paging processing device used in a remote user equipment (UE), comprising a processor, a memory and a transceiver, wherein the processor is configured to: determine a relay UE corresponding to the remote UE when the remote UE needs to monitor and/or receive a paging message through a paging relay, the relay UE being configured to monitor and/or receive the paging message transmitted by a network to the remote UE; establish a paging relay connection between the remote UE and the relay UE; and monitor and/or receive the paging message forwarded by the relay UE after the establishment of the paging relay connection, the transceiver is configured to receive and transmit data, and the memory is configured to store therein data for the operation of the processor, wherein the processor is further configured to:

establish a communication connection between the remote UE and the relay UE;

transmit a paging relay connection establishment request message to the relay UE after the establishment of the communication connection;

receive a response message for a paging relay connection establishment request from the relay UE, the response message carrying a configuration parameter of a paging relay resource pool for forwarding the paging message allocated by a network device for the relay UE;

configure the paging relay resource pool in accordance with the configuration parameter of the paging relay resource pool, the paging relay resource pool being a reception resource pool through which the paging message is received by the remote UE from the relay UE; and transmit a paging relay configuration completion message to the relay UE.

15. The paging processing device according to claim 14, wherein the processor is further configured for: monitoring and/or receiving, by the remote UE, the paging message through the paging relay when channel quality between the remote UE and a base station is smaller than a first threshold and channel quality between the remote UE and the relay UE is greater than a second threshold.

16. The paging processing device according to claim 14, wherein the processor is further configured for: monitoring and/or receiving, by the remote UE, the paging message through the paging relay when a current coverage enhancement level of the remote UE is a predetermined coverage enhancement level.

* * * * *